United States Patent
Saito (10) Patent No.: US 8,958,135 B2
(45) Date of Patent: Feb. 17, 2015

(54) IMAGE DISPLAY CONTROL APPARATUS AND IMAGE DISPLAY CONTROL METHOD

(71) Applicant: Canon Kabushiki Kaisha, Tokyo (JP)

(72) Inventor: Tadao Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 13/841,193

(22) Filed: Mar. 15, 2013

(65) Prior Publication Data

US 2013/0250376 A1 Sep. 26, 2013

(30) Foreign Application Priority Data

Mar. 21, 2012 (JP) ................. 2012-063663

(51) Int. Cl.
*H04N 1/04* (2006.01)
*H04N 1/36* (2006.01)
*H04N 1/00* (2006.01)

(52) U.S. Cl.
CPC ....... *H04N 1/00477* (2013.01); *H04N 1/00018* (2013.01); *H04N 1/00037* (2013.01); *H04N 1/0005* (2013.01); *H04N 1/00074* (2013.01); *H04N 1/00469* (2013.01); *H04N 2201/0094* (2013.01)
USPC ........... 358/488; 358/474; 358/412; 358/486; 358/496; 358/498; 358/444; 358/437

(58) Field of Classification Search
USPC ......... 358/412, 409, 486, 496, 498, 497, 488, 358/404, 444, 403, 437; 382/312, 318, 319, 382/305
See application file for complete search history.

(56) References Cited

U.S. PATENT DOCUMENTS

| | | | | |
|---|---|---|---|---|
| 4,908,664 A | * | 3/1990 | Ogura | 399/204 |
| 6,851,609 B2 | * | 2/2005 | Ando et al. | 235/454 |
| 7,301,680 B1 | * | 11/2007 | Jones | 358/496 |
| 8,040,577 B2 | * | 10/2011 | Akiyama | 358/486 |
| 8,488,212 B2 | * | 7/2013 | Akahane | 358/474 |
| 8,514,467 B2 | * | 8/2013 | Shimada | 358/496 |
| 2009/0066988 A1 | * | 3/2009 | Imaizumi | 358/1.13 |
| 2009/0316233 A1 | * | 12/2009 | Inukai | 358/498 |
| 2011/0242611 A1 | * | 10/2011 | Nozaki | 358/437 |
| 2011/0242620 A1 | * | 10/2011 | Yamamoto | 358/488 |
| 2013/0148863 A1 | * | 6/2013 | Muraishi | 382/112 |
| 2013/0208290 A1 | * | 8/2013 | Ikari | 358/1.12 |

FOREIGN PATENT DOCUMENTS

| | | |
|---|---|---|
| JP | 2008-041111 A | 2/2008 |
| JP | 2010-035019 A | 2/2010 |

* cited by examiner

*Primary Examiner* — Cheukfan Lee
(74) *Attorney, Agent, or Firm* — Canon U.S.A., Inc. IP Division (57) ABSTRACT

An apparatus includes a determining unit configured to determine whether a malfunction of relative movement between a document and an image reading unit reading an image of the document occurs when the document is read by the image reading unit while at least one of the document and the image reading unit is moved, a specifying unit configured to specify a position in image data of the image read by the image reading unit corresponding to a position where the malfunction occurs if the determining unit determines that the malfunction of relative movement occurs, and a control unit configured to cause an image display unit to display an image based on the image data to enable a user to discriminate the position specified by the specifying unit.

10 Claims, 6 Drawing Sheets

FIG. 2

IMAGE DISPLAY CONTROL APPARATUS AND IMAGE DISPLAY CONTROL METHOD

BACKGROUND OF THE INVENTION

1. Field of the Invention

The present invention relates to an image display control apparatus capable of displaying an image of a read document and an image display control method.

2. Description of the Related Art

An image display apparatus is known to display a preview of image data read by an apparatus, such as a digital multifunction peripheral (MFP), having an image reading function of a document. In the image display apparatus, a user checks image data of the read document by preview display, and properly enlarges and displays the data, thereby determining whether a reading malfunction occurs. However, the operation for checking whether the reading malfunction occurs requires checking of the entire image data, and thus takes a long time. In particular, if the image data of the large-sized document is checked, it tends to take a longer time to check the malfunction.

Japanese Patent Application Laid-Open No. 2010-35019 discusses an image forming apparatus that can enlarge and display a preview of a portion for additional processing of additional information or post-processing on a recording medium, such as punching or stapling, when outputting data subjected to the additional processing or post-processing.

However, in the image forming apparatus discussed in Japanese Patent Application Laid-Open No. 2010-35019, when checking the reading malfunction, the entire image data needs to be checked.

There is also the similar problem when the read image data is displayed on another display apparatus.

SUMMARY OF THE INVENTION

According to an aspect of the present invention, an apparatus includes a determining unit configured to determine whether a malfunction of relative movement between a document and an image reading unit reading an image of the document occurs when the document is read by the image reading unit while at least one of the document and the image reading unit is moved, a specifying unit configured to specify a position in image data of the image read by the image reading unit corresponding to a position where the malfunction occurs if the determining unit determines that the malfunction of relative movement occurs, and a control unit configured to cause an image display unit to display an image based on the image data to enable a user to discriminate the position specified by the specifying unit.

According to an exemplary embodiment of the present invention, when a malfunction occurs at a document conveyance speed or a movement speed of an image reading unit, the malfunction is detected and a position where the malfunction is detected is specified in the read image data. Thus, the user can easily check a position with high possibility at which a document reading malfunction occurs. Advantageously, it is possible to easily check the document reading malfunction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
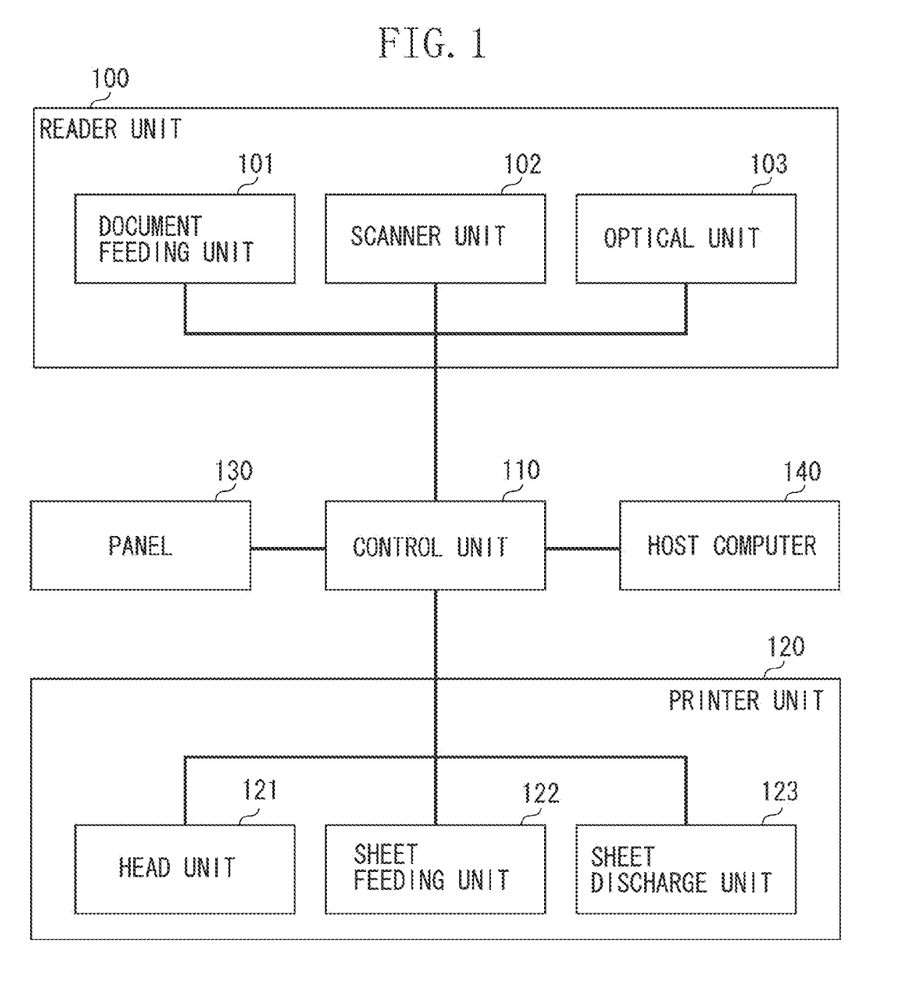
FIG. 1 is a block diagram illustrating an entire configuration of an image processing system according to an exemplary embodiment of the present invention.

An exemplary embodiment of the present invention is described. According to the present exemplary embodiment, an image processing system in FIG. 1 is described as an example. FIG. 1 is a block diagram illustrating the entire configuration of the image processing system.

According to the present exemplary embodiment, the image processing system includes a multifunction peripheral (MFP) having a reader unit 100, a control unit 110, a printer unit 120, and a panel 130, and a host computer 140.

The reader unit 100 is an image input unit and includes a document feeding unit 101 that conveys a document, a scanner unit 102 that optically reads a document image, and an optical unit 103 that measures a document conveyance amount.

In the reader unit 100, the document feeding unit 101 conveys the document, and the scanner unit 102 having a plurality of line sensors reads the document. According to the present exemplary embodiment, the scanner unit 102 includes the plurality of line sensors to increase a reading speed. However, the exemplary embodiment is not limited to this.

The optical unit 103 includes a function of reading a paper fingerprint, such as a sheet fiber pattern of the document. Based on the movement amount of the paper fingerprint, a document conveyance amount per unit time can be measured. The optical unit 103 includes a light emitting unit and a light receiving unit. Light is emitted from the light emitting unit to the document, and the reflected light from the document is received by the light receiving unit. The optical unit 103 uses a known technique of an optical pointing device, for example, discussed in Japanese Patent Application Laid-Open No. 2008-41111. Specifically, infrared light is emitted to the document from an infrared light emission diode as the light emitting unit, and the reflected light forms an image on an area sensor as the light receiving unit. The reflected light is digitized with proper resolution by sensor units in the area sensor, and a feature of the paper fingerprint of the document is stored in a memory 204. The document movement amount is measured by comparing the position of the paper fingerprint of the document between samples stored in the memory 204. As a consequence, the optical unit 103 calculates a conveyance speed from the document conveyance amount per unit time.

The printer unit 120 is an image output unit and includes a sheet feeding unit 122 that feeds a print medium, such as a roll sheet, a head unit 121 that records an image based on image data to the print medium by applying a recording agent, such as ink, while serially scanning the print medium, and a sheet discharge unit 123 that outputs the print medium, on which the printing is performed, outside the printer unit 120.

When operating a copy function in the image processing system, the control unit 110 controls the reader unit 100 to read the image data of the document, and further controls the printer unit 120 to output the image based on the read image data to the print medium. When operating a scanner function, the control unit 110 controls the reader unit 100 to read the document image, converts the image data read from the reader unit 100 into code data, and transmits the data to the host computer 140 via a network. When operating a printer function, the control unit 110 converts code data received from the host computer 140 via the network into image data, and further controls the printer unit 120 to output the image based on the image data to the print medium.

Figure 2:
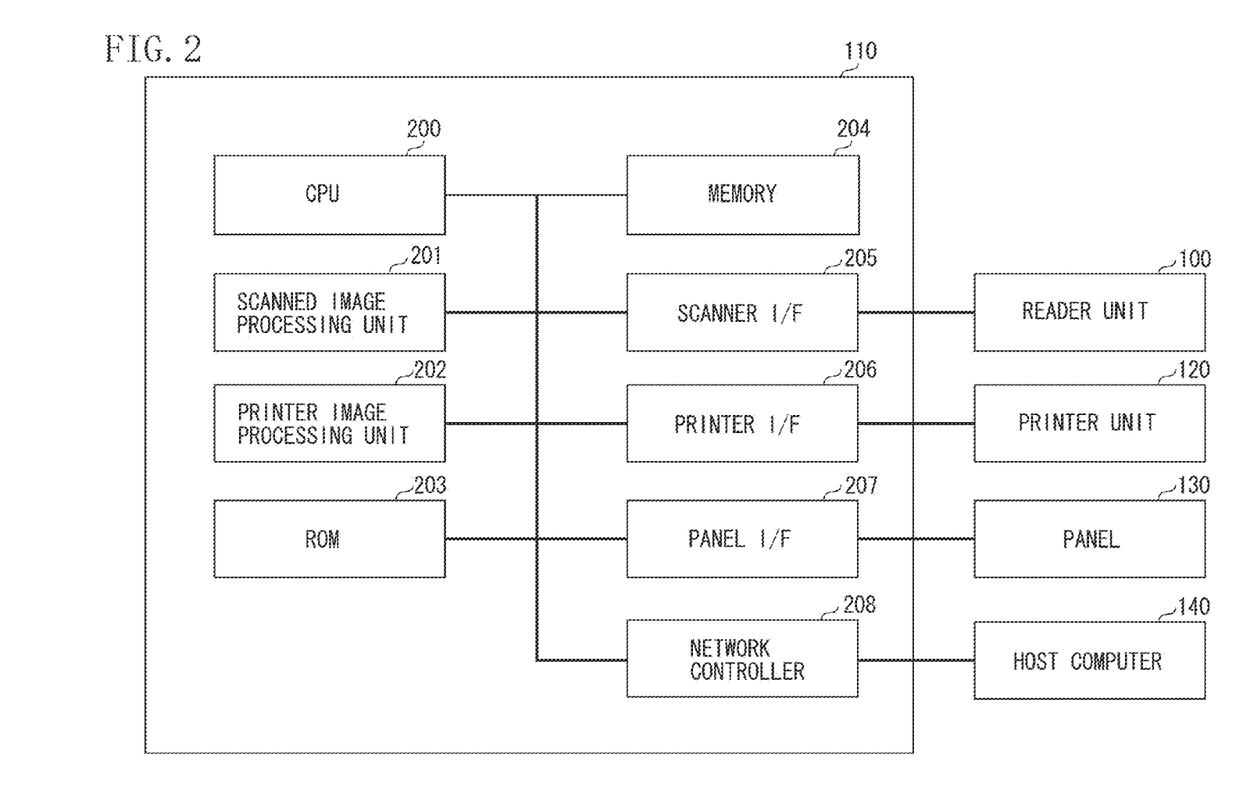
FIG. 2 is a block diagram illustrating a configuration of a control unit according to the present exemplary embodiment.

The details of a configuration of the control unit 110 according to the present exemplary embodiment are described with reference to FIG. 2. FIG. 2 is a block diagram illustrating the configuration of the control unit 110.

The control unit 110 includes a central processing unit (CPU) 200, a scanned image processing unit 201, and a printer image processing unit 202. The control unit 110 includes a read-only memory (ROM) 203, the memory 204, a scanner interface (I/F) 205, a printer interface (I/F) 206, a panel interface (I/F) 207, and a network controller 208.

The ROM 203 stores a program, and the program is loaded into the memory 204. The CPU 200 is operated by the program loaded into the memory 204, and controls the entire operation of the control unit 110. An operation for interpreting page description language (PDL) code data received from the host computer 140 and rasterizing the data to raster image data is described to the program stored in the ROM 203. The CPU 200 executes processing such as the interpretation of the code data and rasterization of the image data.

The scanner I/F 205 is connected to the reader unit 100 to receive the image data input from the reader unit 100 and transfer the image data to the memory 204 and the scanned image processing unit 201.

The scanned image processing unit 201 performs predetermined image processing of the image received from the scanner I/F 205. The image processing includes interlinear correction for correcting positional deviation of the plurality of line sensors, and shading correction for correcting the sensitivity unevenness of the line sensors.

The printer I/F 206 is connected to the printer unit 120, outputs the image data to the head unit 121 of the printer unit 120, and further outputs control data to the sheet feeding unit 122 and the sheet discharge unit 123.

The panel I/F 207 communicates data with the panel 130. The panel 130 includes a liquid crystal display and a plurality of hard keys. The hard key may be a touch panel arranged to overlap the liquid crystal display. A signal input by the hard key is transmitted to the CPU 200 via the panel I/F 207. The liquid crystal display of the panel 130 displays the data sent from the panel I/F 207. The liquid crystal display of the panel 130 displays a preview image and information for operating the MFP.

The network controller 208 is connected to the host computer 140 via an external network, and is used for PDL data reception from the host computer 140 and transmission of the scanned image to the host computer 140.

The printer image processing unit 202 includes a function of inputting the raster image data from the memory 204 and outputting data performed image processing to the memory 204. The printer image processing unit 202 includes a function for converting the data received from the scanned image processing unit 201 and the host computer 140 into binary data of yellow, magenta, cyan, and black (YMCK) and transferring the converted data to the head unit 121. The image processing includes processing of decoding, input gamma, resolution conversion, color space, output gamma, error diffusion, and halftone dot.

When the document is conveyed and the image of the document is read by the reader unit 100, the document conveyance malfunction may occur. If the document conveyance malfunction occurs, an error may be generated between a document conveyance amount to be required to read the image data and an actual document conveyance amount, and may influence on an image quality.

The document conveyance malfunction includes a slip between a roller portion of the document feeding unit 101 and the document at the scanning operation of the scanner unit 102 while the document feeding unit 101 conveys the document. In particular, a large-format MFP uses a document with various thicknesses or materials, and the malfunction of the scanned image due to the type of the document may be easily caused. The slip may occur due to deterioration of the roller portion of the document feeding unit 101 or an adhered material to the roller portion.

Another document conveyance malfunction may occur in addition to the document slip. When the scanning operation and another processing are performed in parallel, for example, a print job from the host computer 140 is performed during the scanning operation, the document conveyance may be suspended due to an excessive processing load of the control unit 110, the shortage of an interface data transfer band, or a memory capacity. If the document conveyance is suspended, the malfunction of the scanned image may occur due to a discontinuous state at the boundary after and before the suspension.

According to the present exemplary embodiment, the document conveyance malfunction is detected, the position of the document conveyance malfunction is specified in the read image data, and the position is displayed to enable the check. As a consequence, the user can easily check a portion in which the reading may not be accurately performed in the read image data.

Figure 3:
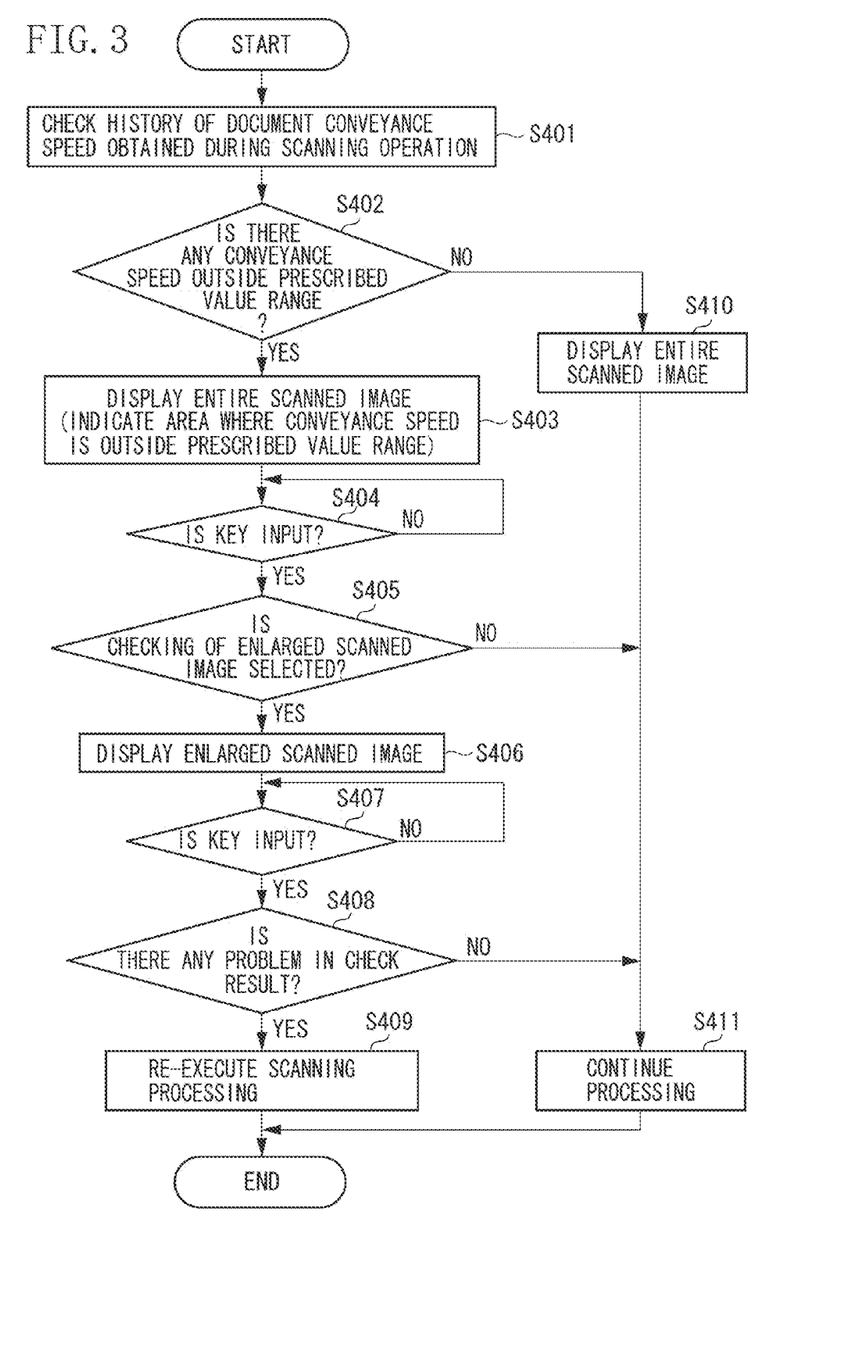
FIG. 3 is a flowchart illustrating image display control according to the present exemplary embodiment.
Figure 4A:
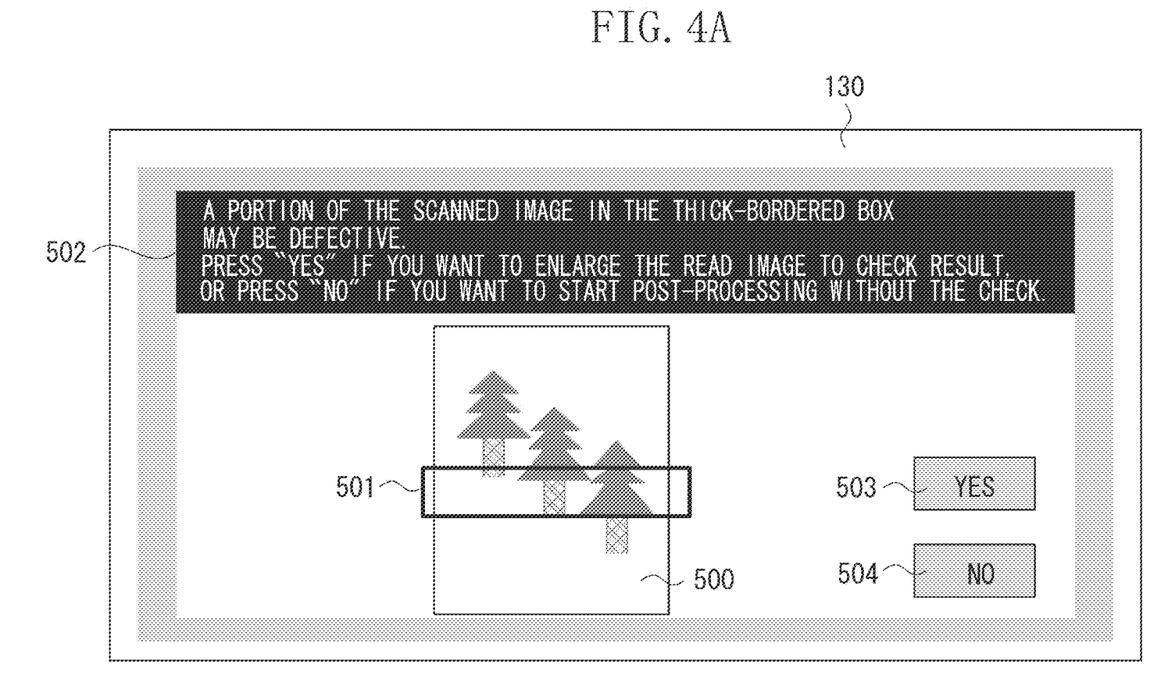
FIGS. 4A and 4B are diagrams illustrating preview displays of an entire document and an enlarged image according to the present exemplary embodiment.
Figure 4B:
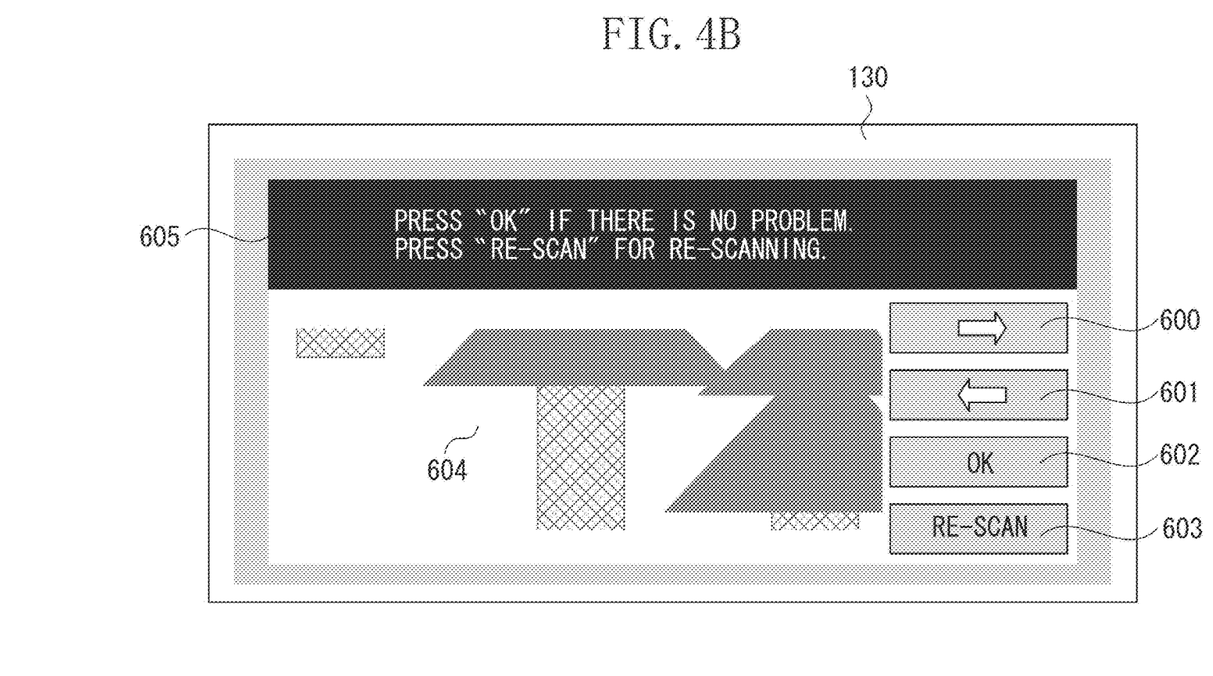

Image display control according to the present exemplary embodiment is described with reference to FIGS. 1, 3, and 4A and 4B. FIG. 3 is a flowchart illustrating a processing flow when the reader unit 100 reads a document image to perform preview display in copy processing. The flowchart illustrates the processing flow for loading the program stored in the ROM 203 into the memory 204 and executing the program by the CPU 200. FIGS. 4A and 4B illustrate the preview display of the panel 130.

A document is set to the reader unit 100 in FIG. 1 and the scanner unit 102 starts the scanning operation of the document at the same time when the document feeding unit 101 conveys the document. In the scanning operation, the optical unit 103 measures a document conveyance amount per unit time, that is, a conveyance speed. A measurement result is stored in the memory 204 with a time stamp.

The CPU 200 determines whether the conveyance amount per unit time falls within the range of a prescribed value stored in advance to the memory 204. That is, if the conveyance speed measured by the optical unit 103 is outside the prescribed value range, the CPU 200 detects the document conveyance malfunction. If the conveyance speed is outside the prescribed value range, the position is managed as a history.

That is, in the read image data, the position where the conveyance speed is outside the prescribed value range is specified and managed.

The document conveyance speed is predetermined depending on the setting of the resolution of the scanned image. As the resolution is higher, the document conveyance speed is lower. As the resolution is lower, the document conveyance speed is higher. However, the document conveyance speed may not be uniquely determined depending on the resolution of the scanned image. Therefore, the prescribed value of the document conveyance speed may be set to fall within a predetermined range of the predetermined document conveyance speed. If the document conveyance speed is "0", that is, if the document conveyance is suspended, it is determined that the document conveyance speed is outside the prescribed value range.

After ending the scanning, the user checks the scanned image before storing the image data or printing the data.

In step S401 in FIG. 3, the CPU 200 checks the history of the document conveyance speed.

In step S402, the CPU 200 checks whether there is any document conveyance speed outside the prescribed value range. If there is any document conveyance speed outside the prescribed value range (YES in step S402), the processing advances to step S403. If there is not any document conveyance speed outside the prescribed value range, that is, all the document conveyance speeds are within the prescribed value range (NO in step S402), then in step S410, the entire scanned image is displayed and the processing advances to step S411.

In step S403, the panel 130 displays the entire scanned image to specify a position where the document conveyance speed is outside the prescribed value range, that is, a position where the document conveyance malfunction occurs. The entire scanned image (hereinafter, also referred to as a "preview image 500") is displayed by processing the image data of the read document by the scanner unit 102 by the scanned image processing unit 201 and transmitting the data to the panel 130. The CPU 200 specifies the position where the document conveyance malfunction occurs by the size (horizontal and vertical lengths) of the document image and the timing at which the document conveyance malfunction occurs.

The position (the portion) where the document conveyance speed of the preview image 500 is outside the prescribed value is specified by a thick-bordered box 501 as illustrated in FIG. 4A. According to the present exemplary embodiment, a user is notified that there may be a scanning malfunction in a display area 502. That is, according to the present exemplary embodiment, the user is notified the position of the document conveyance malfunction as a "portion with high possibility of the reading malfunction" since the position where the document conveyance malfunction occurs has a high possibility of the reading malfunction. Specifically, as illustrated in FIG. 4A, the display area 502 displays that 'a portion of the scanned image in the thick-bordered box may be detective. Press "YES" if you want to enlarge the read image to check result, or press "NO" if you want to start post-processing without the check.'

In step S404, the CPU 200 checks whether there is an input via the key when displaying the entire scanned image. If there is the input via the key (YES in step S404), in step S405, it is determined whether the user selects checking of the enlarged scanned image. According to the present exemplary embodiment, as illustrated in FIG. 4A, a "YES" key 503 and a "NO" key 504 are provided for the user to select whether to enlarged display the position with the malfunction possibility of the scanned image, i.e., the position at which the document conveyance malfunction occurs on the panel 130. If the user checks the enlarged image, the user selects the "YES" key 503 on the panel 130. If the user does not check the enlarged image, the user selects the "NO" key 504 on the panel 130. If the "YES" key 503 on the panel 130 is pressed, the checking of the enlarged image is selected (YES in step S405), and the processing advances to step S406. On the other hand, if the "NO" key 504 on the panel 130 is pressed, the checking of the enlarged image is not selected (NO in step S405), and the processing advances to step S411.

In step S406, the enlarged scanned image is displayed. Specifically, as illustrated in FIG. 4B, the panel 130 preview-displays the scanned image in the thick-bordered box 501 with a predetermined enlargement rate. According to the present exemplary embodiment, as illustrated in FIG. 4B, arrow keys 600 and 601 are arranged to check the scanned image enlarged at a predetermined enlargement rate in the horizontal direction with scrolling in the horizontal direction. A display area 605 on the panel 130 displays a checking message about whether re-scanning is performed. As illustrated in FIG. 4B, the display area 605 displays 'press "OK" if there is no problem. Press "re-scan" for re-scanning.'

In step S407, the CPU 200 checks whether there is an input via the key when displaying the enlarged scanned image. If there is the input via the key (YES in step S407), in step S408, it is determined whether the user selects the re-scanning. The user checks the enlarged preview display 604. If there is not any problem in the check result (i.e., the re-scanning is not to be performed), the user selects an OK key 602. If performing the re-scanning, the user selects a re-scan key 603. If the user presses the re-scan key 603 on the panel 130 (YES in step S408), the processing advances to step S409. If the user presses the OK key 602 on the panel 130 (NO in step S408), which means that the user does not select the re-scanning to be performed, the processing advances to step S411.

In step S409, the document feeding unit 101 conveys the document to a reading start position, and the re-scanning is performed.

In step S411, processing subsequent to the scanning operation continues. If operating the scanning function, the CPU 200 stores the read scanned image in a storage medium designated by the user. If operating the copy function, the printer unit 120 prints the read scanned image.

According to the present exemplary embodiment, if the malfunction of the document conveyance speed occurs, the CPU 200 detects the conveyance speed malfunction and specifies the detected malfunction position in the image data to be stored. Further, the panel 130 displays the position for enabling the checking thereof in the preview display. Thus, the user can easily check the malfunction position in the document conveyance speed, i.e., a position with high possibility of the scanning malfunction. As mentioned above, the image processing system properly controls the preview display, and thereby the user easily checks the scanning malfunction. The malfunction of print result is reduced, thereby reducing costs without unnecessarily using the print medium.

The exemplary embodiment of the present invention has been described. The basic configuration of the exemplary embodiment of the present invention is not limited to this. According to the present exemplary embodiment, the optical unit 103 measures the document conveyance amount. However, the exemplary embodiment of the present invention is not limited to this, and may be embodied by a known method. For example, a roller containing a high-friction material, such as rubber, may be made contact with the document to measure the document conveyance amount by an encoder converting rotation of the roller into an electrical signal.

According to the present exemplary embodiment, the document conveyance malfunction is determined by the document conveyance amount. The conveyance malfunction may be detected without the document conveyance amount being measured. The control unit 110 may observe the document feeding unit 101 and, if the document conveyance is suspended, it may be determined that the document conveyance malfunction occurs.

According to the present exemplary embodiment, the panel 130 includes a touch-panel type display, and the display and a function of the selection key can be changed for each display. However, the exemplary embodiment of the present invention is not limited to this. For example, the panel 130 may not have the selection key and the selection key may be arranged outside the panel 130.

According to the present exemplary embodiment, the scanned image is displayed on the panel 130. However, the device that displays the scanned image is not limited to this, and the scanned image may be displayed on a display unit of the host computer 140.

According to the present exemplary embodiment, the image is enlarged and displayed after displayed as the entire scanned image. If the document conveyance malfunction occurs, the document conveyance malfunction position may be enlarged and displayed without the entire scanned image being displayed.

The image processing system may not have the unit that selects whether to check the enlarged scanned image. In this case, if the CPU 200 detecting the conveyance malfunction, the user is notified that the malfunction of the scanned image may occur. Then, the conveyance malfunction position may be automatically enlarged and displayed. The enlargement and display may be performed before the preview display or after the preview display. Similarly to the foregoing, only the corresponding portion may be checked without the preview display that displays the entire scanned image.

According to the present exemplary embodiment, if the document conveyance malfunction occurs, it is selected whether to check the enlarged image. Alternatively, it may be configured that the enlarged image is not checked. It may be selected at the initial setting whether to check the enlarged image. If selected at the initial setting that the enlarged image is not checked, the enlargement and display may be skipped.

According to the present exemplary embodiment, the document conveyance speed is outside the prescribed value range at one position. Even if the document conveyance speed is outside the prescribed value range at a plurality of positions, the image display may be controlled by the similar method. If the document conveyance speed is outside the prescribed value range at a plurality of positions, in other words, there is a plurality of positions where the document conveyance malfunction is detected, the enlarged images may be sequentially displayed. Specifically, if the document conveyance malfunction is detected, on the preview display of the entire scanned image, a position where a first document conveyance malfunction occurs is displayed for enabling the checking. Then, with a method similar to that according to the present exemplary embodiment, the enlarged image at the first position is checked. After ending the checking of the enlarged image at the first position, if the malfunction of the scanned image does not occur, the entire scanned image is preview-displayed again. If the malfunction of the scanned image occurs, the re-scanning is performed. On the second preview display of the entire scanned image, the position of the second conveyance malfunction is indicated by the thick-bordered box 501. Then, the user may check the image with the preview image by performing the similar operation to that of the checking of the enlarged image at the first position. By sequentially performing processing in steps S403 to S409 and S411 at each position where the document conveyance speed is outside the prescribed value range, the exemplary embodiment may deal with a case where the document conveyance malfunction is detected at a plurality of positions. If there is a plurality of positions where the document conveyance malfunction is detected, all the positions may be displayed on the preview display in step S403 and the position for checking the enlarged image may be sequentially selected by the user. Further, the enlarged image may be displayed and checked on a plurality of malfunction basis.

According to the exemplary embodiment, the document feeding unit 101 in the reader unit 100 conveys the document, and the scanner unit 102 reads the document. Further, the present exemplary embodiment may be applied to a configuration in which an image reading unit is movable relative to the document. With a configuration in which the reader unit 100 reads a fixed document by scanning the document by the scanner unit 102, the similar advantage may be obtained. With the apparatus, in place of detecting the malfunction of the document conveyance speed, a malfunction of the movement speed of the scanner unit 102 may be detected.

According to the exemplary embodiment, the enlargement and display are performed, after ending the scanning, on a image at the position of the document whose movement malfunction is detected. Alternatively, the enlargement and display may be performed, in real time during the scanning, on the position of the document whose movement malfunction is detected. In this case, each time when the movement malfunction is detected, the scanning result may be displayed and the scanning may stop. If enlarging and displaying, after entirely ending the scanning, the position of the document whose movement malfunction is detected, it may be possible to prevent, without deterioration in throughput, the troublesomeness that the user checks the scanned image many times for one-time scanning.

Figure 5:
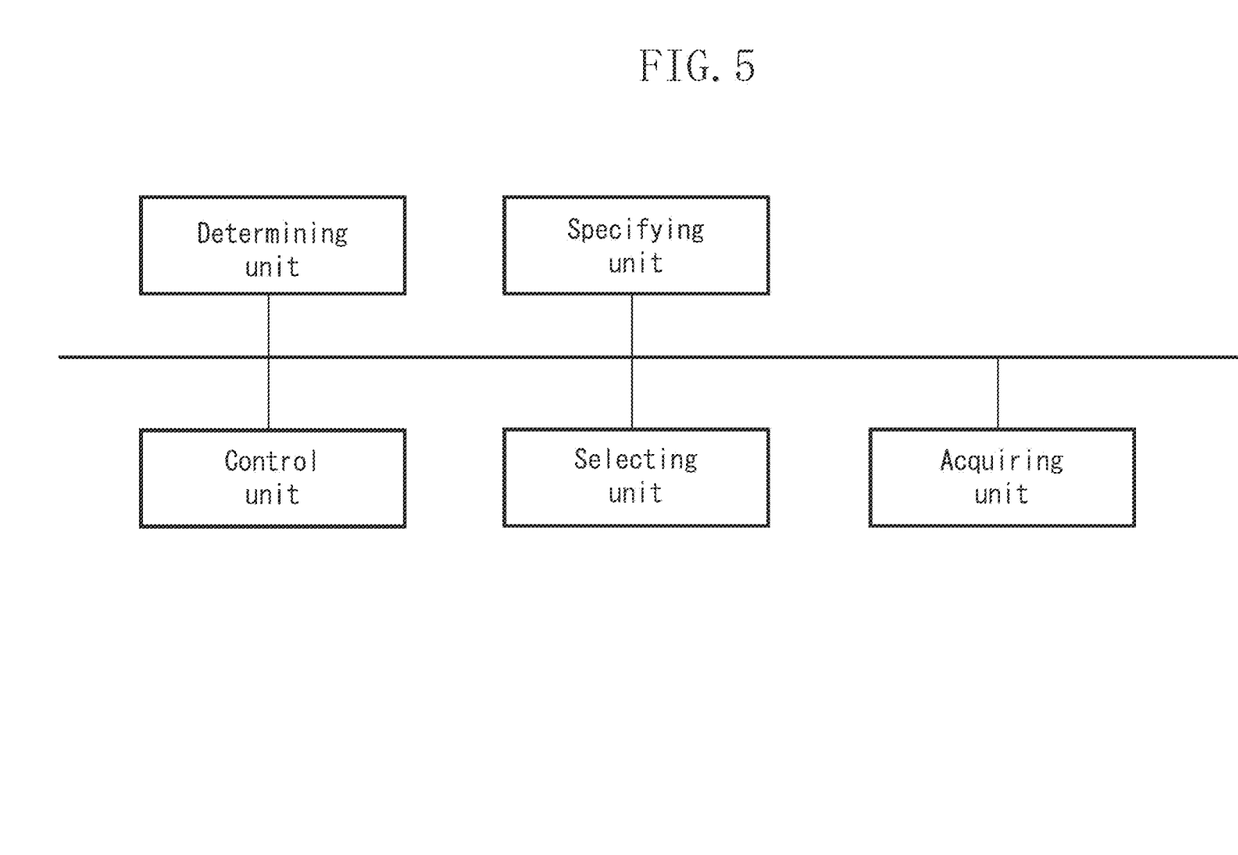
FIG. 5 is a block diagram illustrating a configuration of an apparatus according to the present exemplary embodiment.

According to the exemplary embodiment, the CPU 200 executes the program to execute the flowchart in FIG. 3. However, the present exemplary embodiment is not limited to this. Instead of the CPU 200 executing all processing, hardware, such as application specific integrated circuits (ASIC), may cause the units in FIG. 5 to execute the flowchart. Alternatively, the hardware may cause a part of the units in FIG. 5 to execute the flowchart. Alternatively, software may cause a part of the units in FIG. 5 to execute the flowchart.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-063663 filed Mar. 21, 2012, which is hereby incorporated by reference herein in its entirety.

What is claimed is:

1. An apparatus comprising:
  a determining unit configured to determine whether a malfunction of relative movement between a document and an image reading unit reading an image of the document occurs when the document is read by the image reading unit while one of the document and the image reading unit is moved;
  a specifying unit configured to specify a position in image data of the image read by the image reading unit corresponding to a position where the malfunction occurs if the determining unit determines that the malfunction of relative movement occurs; and
  a control unit configured to cause an image display unit to display an image based on the image data to enable a user to discriminate the position specified by the specifying unit.

2. The apparatus according to claim 1, wherein the control unit causes the image display unit to display an image to enable the user to discriminate the position specified by specifying unit by adding information for discriminating a predetermined region including the position specified by the specifying unit to the image read by the image reading unit.

3. The apparatus according to claim 1, wherein the control unit causes the image display unit to enlarge and display an image of a predetermined region including the position specified by the specifying unit.

4. The apparatus according to claim 3, further comprising a selecting unit configured to select whether the predetermined region including the position specified by the specifying unit is enlarged and displayed,
  wherein the control unit causes the image display unit to enlarge and display the image of the predetermined region including the position specified by the specifying unit if the selecting unit selects the enlargement and display.

5. The apparatus according to claim 1, wherein, if the specifying unit specifies a plurality of positions in the image data, the control unit causes the image display unit to display images of the plurality of positions to enable the user to discriminate the plurality of positions.

6. The apparatus according to claim 1, further comprising an acquiring unit configured to acquire a movement speed in the relative movement between the document and the image reading unit,
  wherein, when the movement speed acquired by the acquiring unit is outside a prescribed value range, the determining unit determines that the movement malfunction occurs.

7. The apparatus according to claim 1, wherein the determining unit detects a conveyance malfunction of the document based on a measurement result of a movement amount of the document measured by an optical unit including a light emitting unit emitting light to the document and a light receiving unit receiving reflected light from the document.

8. The apparatus according to claim 1, wherein, if the relative movement between the document and the image reading unit is suspended, the determining unit determines that the movement malfunction occurs.

9. An image display control method comprising:
  determining whether a malfunction of relative movement between a document and an image reading unit reading an image of the document occurs when the document is read by the image reading unit while one of the document and the image reading unit is moved;
  specifying a position in image data of the image read by the image reading unit corresponding to a position where the malfunction occurs if it is determined that the malfunction of relative movement occurs; and
  causing an image display unit to display an image based on the image data to enable a user to discriminate the specified position.

10. A non-transitory computer-readable storage medium storing a program that causes a computer to execute the image display control method according to claim 9.

* * * * *